United States Patent [19]
Kato

[11] Patent Number: 5,558,577
[45] Date of Patent: Sep. 24, 1996

[54] ELECTRONIC GAME MACHINE AND MAIN BODY APPARATUS AND CONTROLLERS USED THEREIN

[75] Inventor: Shuhei Kato, Kyoto, Japan

[73] Assignee: Nintendo Company, Ltd., Kyoto-fu, Japan

[21] Appl. No.: 450,843

[22] Filed: May 25, 1995

[30] Foreign Application Priority Data

May 25, 1994  [JP]  Japan .................................. 6-110692

[51] Int. Cl.⁶ .................................. G09G 5/08; A63F 9/22
[52] U.S. Cl. .......................... 463/36; 345/156; 345/157; 340/825.03
[58] Field of Search .................................. 273/434, 435, 273/438, 148 B, 85 G, DIG. 28; 364/410; 345/156–158, 161, 1; 340/825.03, 825.71, 825.72, 825.73, 825.74, 825.77

[56] References Cited

U.S. PATENT DOCUMENTS

| | | | |
|---|---|---|---|
| 4,588,187 | 5/1986 | Dell | 273/148 B |
| 4,924,216 | 5/1990 | Leung | 273/438 |
| 5,098,110 | 3/1992 | Yang | 273/438 |
| 5,276,443 | 1/1994 | Gates et al. | 340/825.03 |
| 5,421,590 | 6/1995 | Robbins | 273/438 |

Primary Examiner—Jessica J. Harrison
Assistant Examiner—Mark Sager
Attorney, Agent, or Firm—Nixon & Vanderhye P.C.

[57] ABSTRACT

To present an electronic game machine simple in constitution and excellent in extendability. A main body apparatus comprises an interface having one port and connectors connected in parallel to this one port. Connectors have corresponding capacitors setting channel numbers to corresponding connectors based on different capacitive values. The controllers detect the channel numbers assigned thereto according to the capacitors relating to the corresponding connectors. The I/O circuit sends out read commands including channel numbers to the controllers through port. The controllers detect whether the channel included in the read command coincides or not with the channel number detected. The controller transmits the signal showing its own operation status to the interface when a coincidence condition is detected.

11 Claims, 10 Drawing Sheets

FIG. 7

| B | Y | SL | ST | ← | → | ↓ | → | A | X | L | R | O | O | O | SLOPE 1 | SLOPE 2 |

ELECTRONIC GAME MACHINE AND MAIN BODY APPARATUS AND CONTROLLERS USED THEREIN

The present invention relates to an electronic game machine, and more specifically to an electronic game machine comprising a main console having a plurality of connectors, and plural controllers detachably connected to the connectors.

BACKGROUND AND SUMMARY OF THE INVENTION

FIG. 9 is a perspective outline view showing a general construction of a prior art electronic game system. By way of example, FIG. 9 shows an electronic game system using an electronic game machine manufactured by the present applicant's assignee (Super Nintendo Entertainment System). In FIG. 9, a non-volatile memory cartridge 2, in which the software necessary for running the game is stored, is detachably connected to a main console 1. At the front side of the main console 1, connectors for controllers (hereinafter "connectors") 11a, 11b are provided, and controllers 3 are connected to these connectors. The controllers 3 provide data and control signals to the main console 1 which together form an electronic game machine. A television receiver (hereinafter "television") 4 is also connected to the main console to display the game video frame.

FIG. 10 is a block diagram showing the constitution of the electronic game machine shown in FIG. 9, especially the detail of the connections between the controllers and the main body apparatus. In FIG. 10, inside the main body apparatus 1 are provided a main memory CPU 12, an internal circuit 13, an input/output IC (hereinafter "I/O") 14. The memory cartridge 2 is connected to the main CPU 12 through a cartridge connector. The main CPU 12 sends a write signal WE, a read signal RE, an address signal AD, and a data signal D1 to the I/O 14. The I/O 14 has as many ports as the number of connectors (two ports, A and B in the illustrated example), and each port is connected to each controller 3 through a corresponding connector. From each port of the I/O 14 to the controllers, a reset signal RST and a clock signal CL are given. From the controllers 3 to the corresponding ports, a data signal D2 is given. Reference numeral L1 is a power source line and L2 is a grounding line.

In the prior art electronic game machine, as described above, the I/O 14 must be provided with at least as many ports as the number of connectors. Hence the number of pins provided in the I/O 14 increases and the price of the IC chip comprising the I/O 14 is raised. Besides, in order to extend the number of connectors to be connected to the main body apparatus I in the future, either the I/O 14 must be preliminarily provided with extra ports in consideration of the future extension in the number of connectors, or it must be replaced with an I/O having more ports at the time of the extension. In either case, the provisions required to ensure that the I/O chip can accommodate future expansion was poor.

In the prior art electronic game machine, in order to exchange signals between the I/O 14 and controllers 3, at least three signal lines are needed (a signal line for reset signal RST, a signal line for clock signal CL, and a signal line for data signal D2). This then requires many pins on the I/O 14.

It is hence a primary object of the invention to present an electronic game machine that will better accommodate future expansion, and that will do so in a simple way with a main body apparatus and controllers to be used therein.

SUMMARY OF THE INVENTION

One embodiment of the invention relates to an electronic game machine comprising a main console having a plurality of connectors, and plurality of controllers detachably connected to the individual connectors.

The main console includes: a central processing unit and an I/O circuit for relaying signals between the central processing unit and the connectors. The I/O circuit has ports to which the connectors are connected in parallel. The connectors are then characterized by unique parameters that define the connectors, for example, by channel numbers.

In addition to the main console, controllers are provided, each of which can detect the assigned channel numbers associated with the respective connectors. Then, when the I/O circuit sends a read command to each controller, it includes in the command a specific channel number. Each of the controllers detects the channel number included in the read command and determines if it coincides with the channel number associated with its respective connector. If the channel number coincides, the controller transmits an appropriate operation signal to the I/O circuit informing it of the channel number match.

Once each controller detects the channel number assigned to itself, the read commands are sent out in parallel from the I/O circuit to each controller through the ports by dispersing the send timing of each read command on the time axis. Each controller can then distinguish whether the read command transmitted from the I/O circuit is addressed to itself or to another controller.

In another embodiment of the invention, the I/O circuit has ports and a plurality of connectors to which a plurality of controllers are detachably connected in parallel. Again, each connector can specify a channel number for itself by generating different parameters. Each controller detects the channel number assigned to its corresponding connector. The I/O circuit sends out a read command including a channel number to each controller through a port. Each controller transmits the appropriate operation status signal to the I/O circuit when the channel number included in the read command coincides with its detected channel number.

According to still another embodiment of the invention, controllers are detachably connected to a plurality of connectors provided in the main console of the electronic game machine. In the main console, each connector has or is capable of generating different channel number parameters. Each connector then detects the channel number assigned thereto on the basis of the parameters that it has been given or has generated. A detection is then made to determine if the channel number included in the read command coincides with the channel number detected by each connector, when a read command including a channel number is sent out from the main console. An operation status signal is then transmitted to the main console, in response to a match of channel numbers detected by a connector.

BRIEF DESCRIPTION OF THE DRAWINGS

These and other objects, features, and advantages of the present invention will become apparent from the following detailed description taken in conjunction with the accompanying drawings:

FIG. 7 is a diagram showing a packet in which operation status signals of controllers are stored;

DETAILED DESCRIPTION OF THE DRAWINGS

Figure 1:
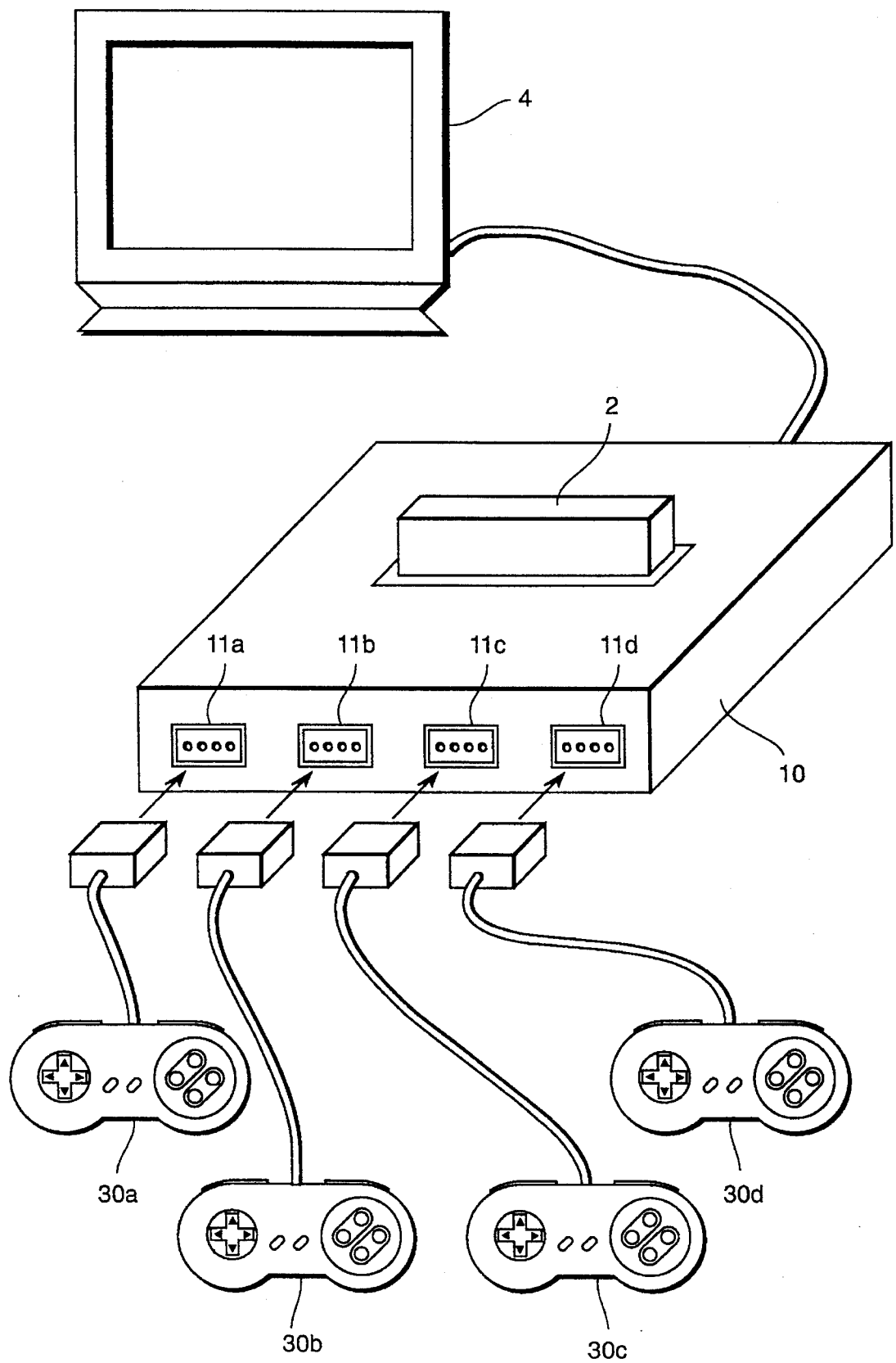
FIG. 1 is a perspective outline view of an electronic game system using an electronic game machine according to an embodiment of the invention.

FIG. 1 is a perspective outline view of an electronic game system according to one embodiment of the invention. In FIG. 1, a non-volatile memory cartridge 2, in which the software necessary for running the game is stored, is detachably connected to a main console 10. At the front side of the main console 10, for example, four connectors 11a to 11d are provided, and controllers 30a to 30d are connected to these connectors. The controllers in combination with the main console 10 constitute an electronic game machine. A television 4 is also connected to the main console 10 to display the game video frame.

Figure 2:
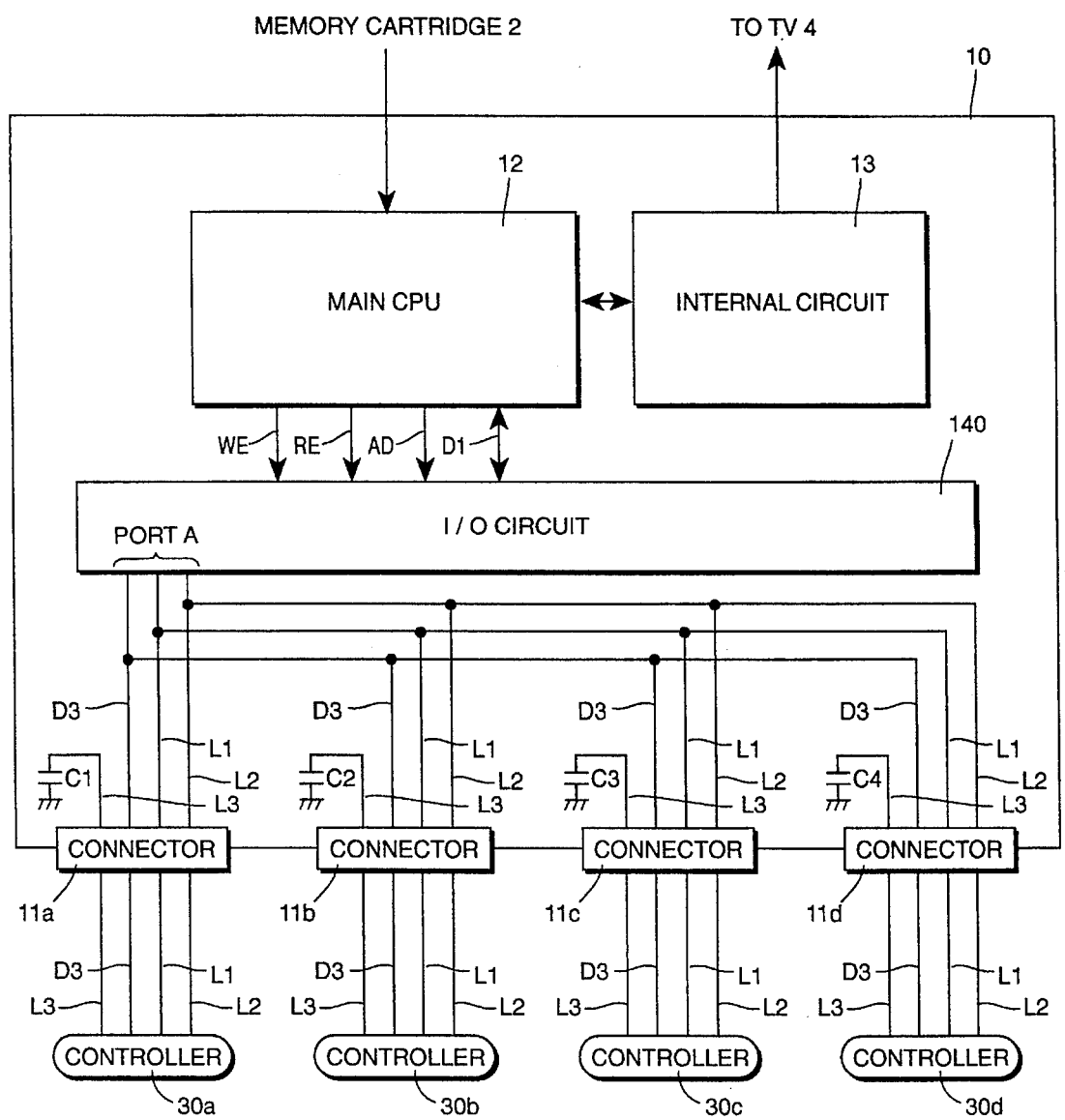
FIG. 2 is a block diagram of the electronic game system shown in FIG. 1, particularly showing the detail of the connections between the controllers and the main body apparatus.
Figure 10:
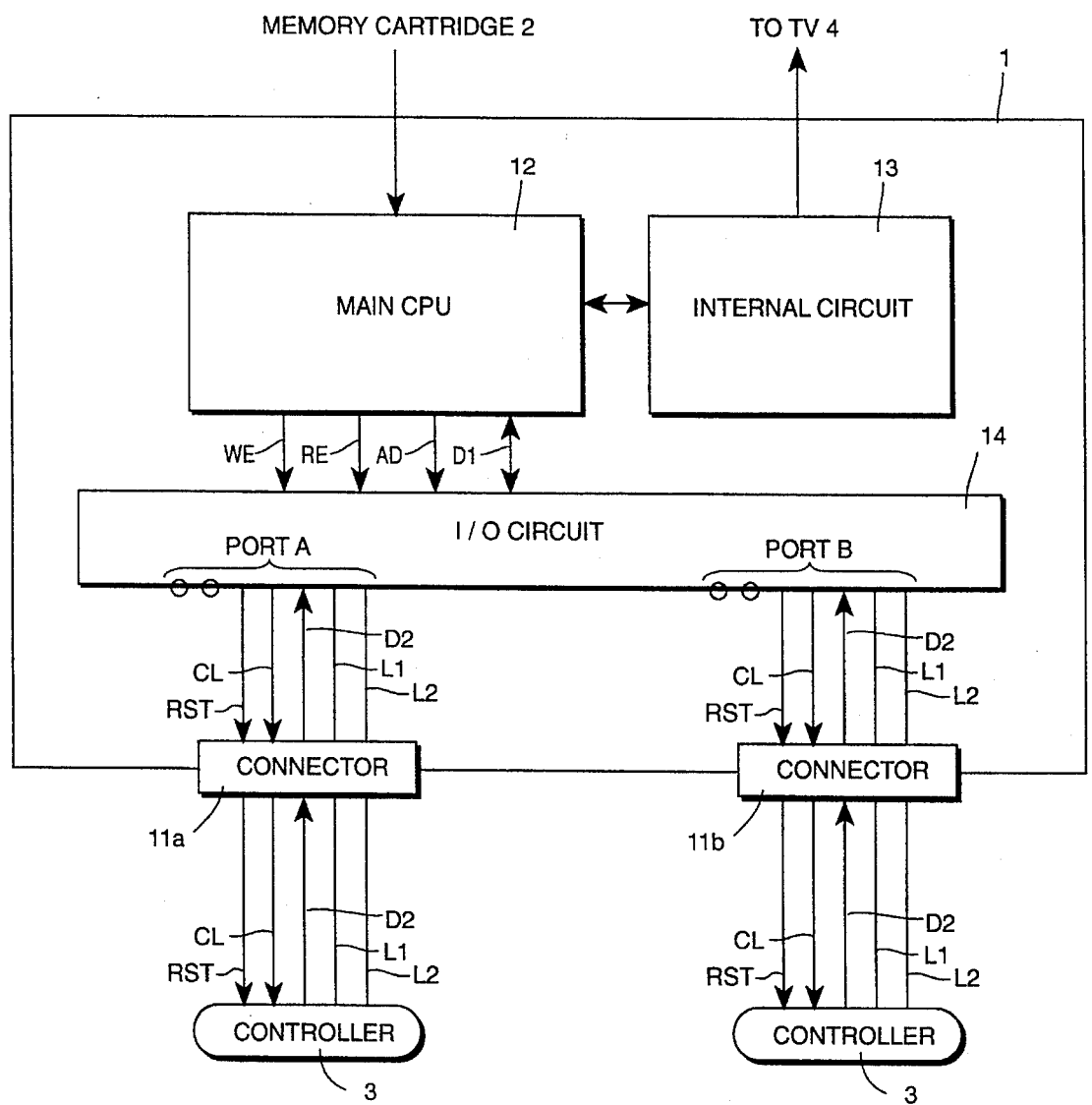
FIG. 10 is a block diagram showing the constitution of the electronic game machine shown in FIG. 9, especially the detail of the connections between the controllers and the main body apparatus.

FIG. 2 is a block diagram of the electronic game machine shown in FIG. 1, especially showing in detail the connections between the main console and the controllers. In FIG. 2, inside the main body apparatus 10, instead of the I/O circuit 14 in FIG. 10, an I/O circuit 140 is provided. The I/O circuit 140 has one port A regardless of the number of connectors, and the port A is connected in parallel to the connectors 11a to 11d. Transmission and reception of data and address between the interface 140 and the controllers 30a to 30d are effected in time division by using one two-way signal line D3. Capacitors C1 to C4 for setting respective channel numbers to each connector are connected to the connectors 11a to 11d. These capacitors C1 to C4 have different capacitive values (for example, increasing in multiples such as C1=100 pF, C2=200 pF, C3=400 pF, C4=800 pF), and are connected to the controllers 30a to 30d through corresponding connectors 11a to 11d and line L3. The remaining elements of the main console 10 are the same as the corresponding elements of the main console 1 shown in FIG. 10. For those elements, the same reference numbers are given to the corresponding parts and the explanation of their structure and function are the same.

Figure 3:
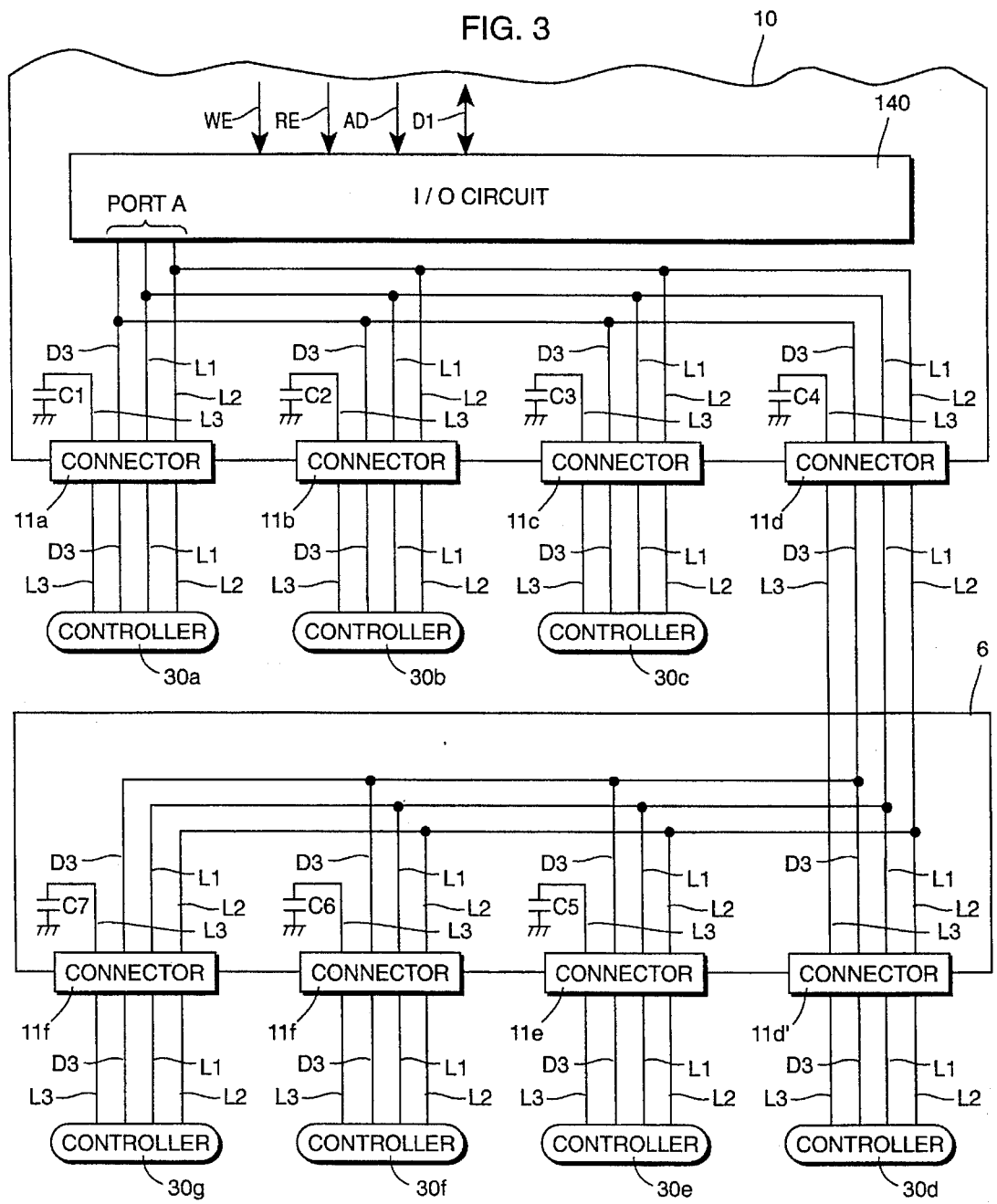
FIG. 3 is a diagram showing the status of the connection of a tap connector for extending the number of available connectors on the electronic game machine in FIG. 1.

FIG. 3 shows an embodiment in which a tap connector is used to expand the number of connectors to the electronic game machine in FIG. 1. In FIG. 3, a tap connector 6 is connected to the connector 11d. The tap connector 6 has connectors 11d' to 11g as expansion connectors. Controllers 30d to 30g are connected to the connectors 11d' to 11g. The connectors 11d' to 11g are connected in parallel inside the tap connector 6, and are connected to the port A of the I/O circuit 140 through the connector 11d. Capacitors C5 to C7 set respective channel numbers to the connectors 11e to 11g. These capacitors C5 to C7 have different capacitive values from capacitance C1 to C4 (for example, increasing in multiples such as C5=1600 pF, C6=3200 pF, C7=6400 pF), and are connected to the controllers 30d to 30g through corresponding connectors 11d' to 11g and line L3.

Figure 4:
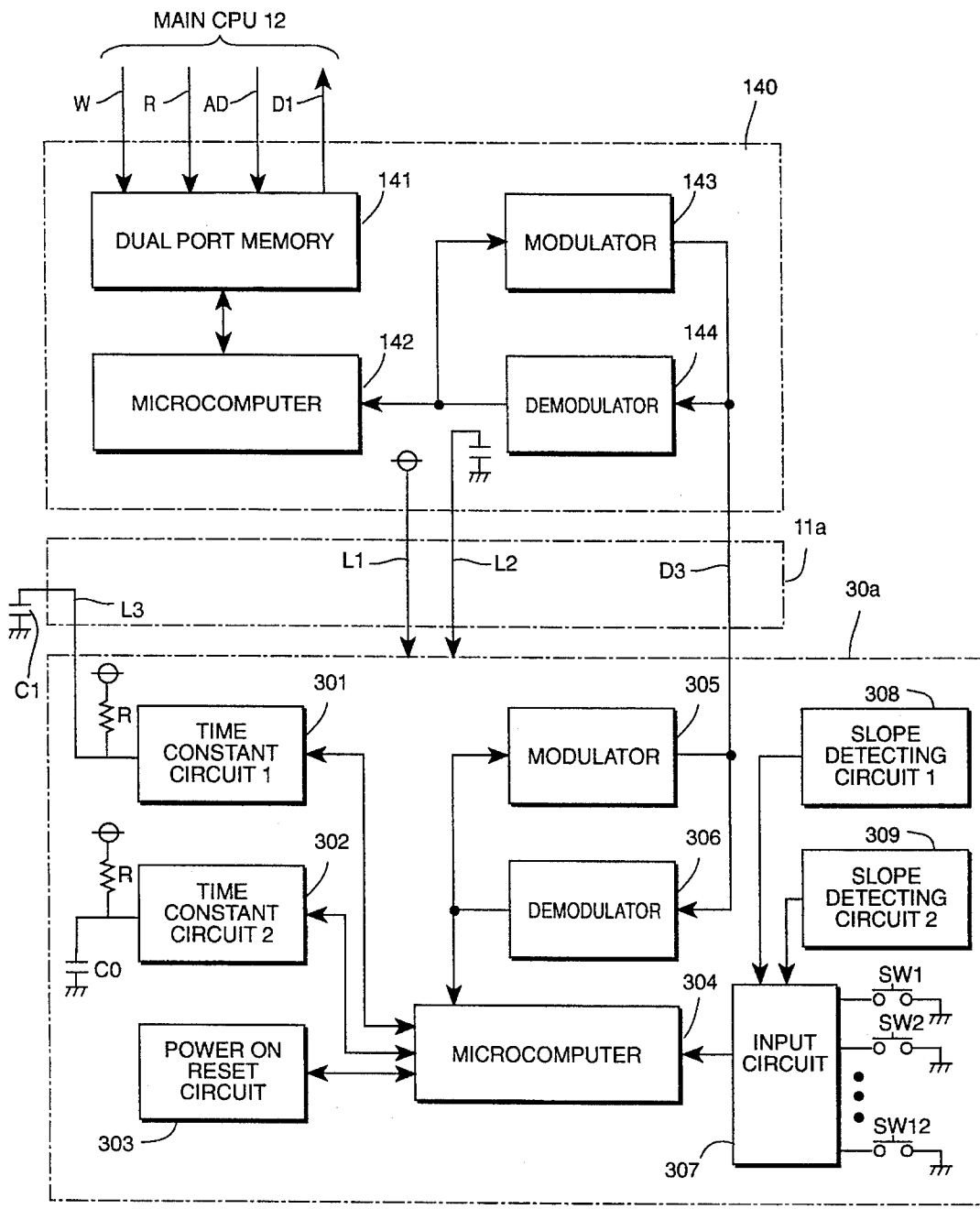
FIG. 4 is a block diagram showing more specifically the construction of interface 140, connector 11a and controller 30a shown in FIG. 2.

FIG. 4 is a block diagram showing more specifically the construction of the I/O circuit 140, connector 11a and controller 30a shown in FIG. 2. The construction of the other connectors 11b to 11g and controllers 30b to 30g (FIG. 3) are the same as that of the connector 11a and controller 30a (FIG. 4). In FIG. 4, the I/O circuit 140 comprises a dual port memory 141, a microcomputer 142, a modulator 143, and a alemodulator 144. The microcomputer 142 communicates data to and from CPU 12 through the dual port memory 141. The modulator 143 modulates the output signal of the microcomputer 142. The output of the modulator 143 is supplied to the controller 30a through the data signal line D3. The demodulator 144 demodulates the signal supplied from the controller 30a through the data signal line D3. The output of the demodulator 144 is supplied to the microcomputer 142.

The controller 30a comprises first and second time constant circuits 301 and 302, a power ON reset circuit 303, a microcomputer 304, a modulator 305, a demodulator 306, an input circuit 307, a plurality of switches SW1 to SW12, and first and second slope detecting circuits 308 and 309. To the first time constant circuit 301, the capacitor C1 relating to the connector 11a is connected, and a resistance R is also connected. To the second time constant circuit 302, a capacitor C0 having a reference capacity is connected, and the resistance R is also connected. The outputs of the first and second time constant circuits 301 and 302 are given to the microcomputer 304. The power ON reset circuit 303 generates a power ON reset pulse when the controller 30a is connected to the connector 11a, that is, when the power is supplied to the controller 30a, and supplies the power ON reset pulse to the microcomputer 304. The modulator 305 modulates the output signal of the microcomputer 304. The output of the modulator 305 is supplied to the I/O circuit 140 through the data signal line D3. The demodulator 306 demodulates the signal supplied from the interface 140 through the data signal line D3. The output of the demodulator 306 is supplied to the microcomputer 304. The input circuit 307 takes in the operation signals of the switches SW1 to SW12, and detection signals of the slope detecting circuits 308 and 309, and feeds them into the microcomputer 304.

Figure 5:
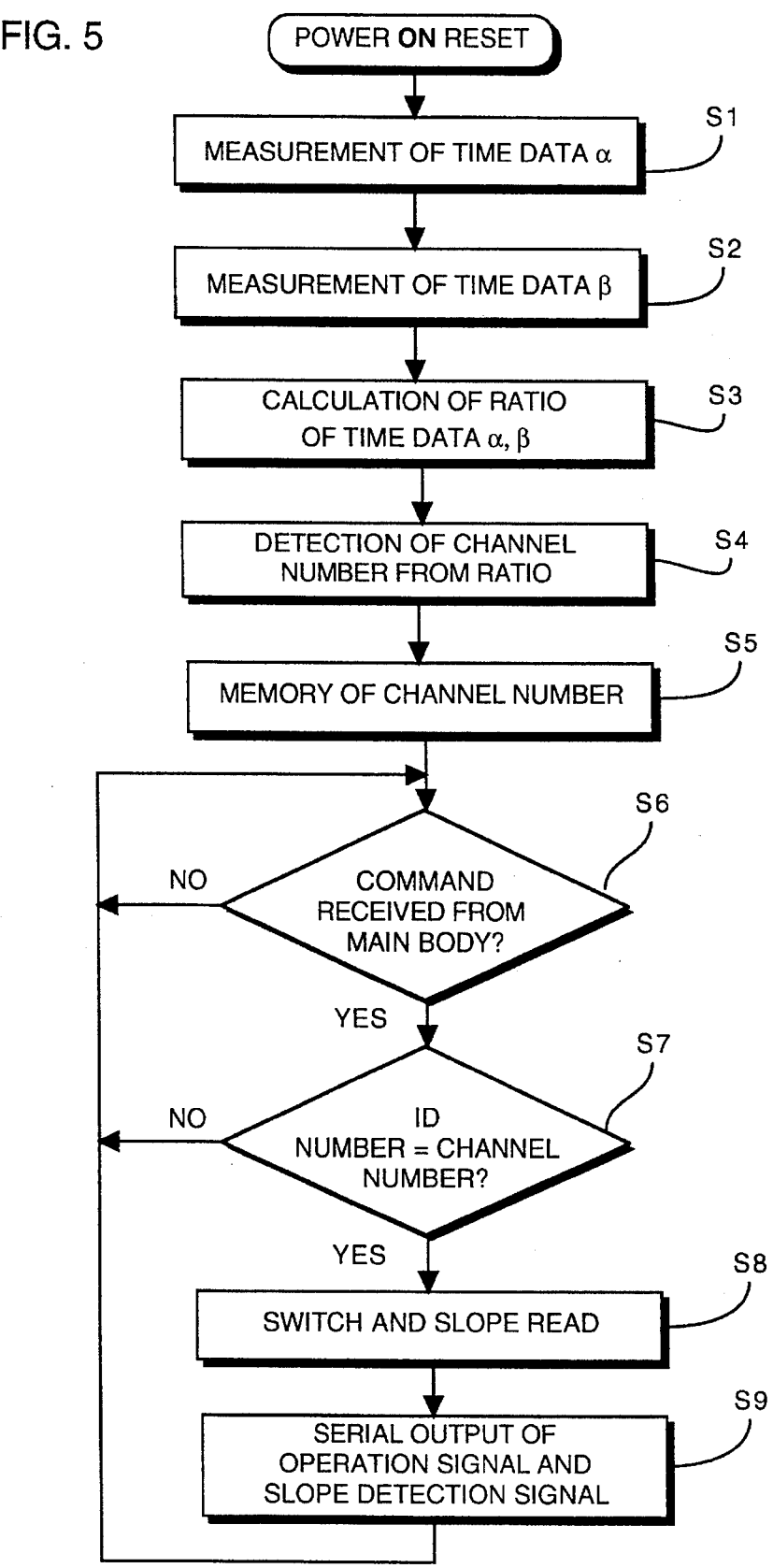
FIG. 5 is a flow chart showing the operation of microcomputer 304 shown in FIG. 4.

FIG. 5 is a flow chart showing the operation of the microcomputer 304 shown in FIG. 4. When the controller 30a is connected to the connector 11a, power is supplied to each circuit of the controller 30a through line L1. As a result, the power ON reset circuit 303 generates a power ON reset pulse, and this power ON reset pulse is supplied to the microcomputer 304. In response, the microcomputer 304 is reset to an initial state and is started up. Also in response to the supply of power, capacitors C1 and C0 charge. At this time, the charged voltages of the capacitors C1 and C0 climb up at the time constant depending on each capacitive value.

The first time constant circuit 301 comprises a comparator for comparing a specific threshold voltage Vref and the charged voltage of the capacitor C1 to detect their coincidence. It also includes a time counter that starts to count when it receives the reset signal from the microcomputer 304 (generated in response to power ON reset pulse) and ends the count when it receives the coincidence detection signal from the comparator. Likewise, the second time constant circuit 302 also comprises a comparator for comparing the specific threshold voltage Vref and the charged voltage of the capacitor C0 to detect their coincidence. It also includes a time counter that starts to count when it receives the reset signal from the microcomputer 304 and ends the count when it receives the coincidence detection signal from the comparator.

The microcomputer 304, when started by the power ON reset pulse, reads the time data $\alpha$ counted by the time counter in the first time constant circuit 301 (showing the time that lapses from the start of the capacitor C1 being charged until the voltage across the capacitor reaches the specific threshold voltage Vref) (step S1). The microcomputer 304 also reads the time data $\beta$ counted by the time counter in the second time constant circuit 302 (showing the time that lapses from the start of the capacitor C0 being charged until the voltage across the capacitor reaches the specific threshold voltage Vref) (step S2).

Figure 6:
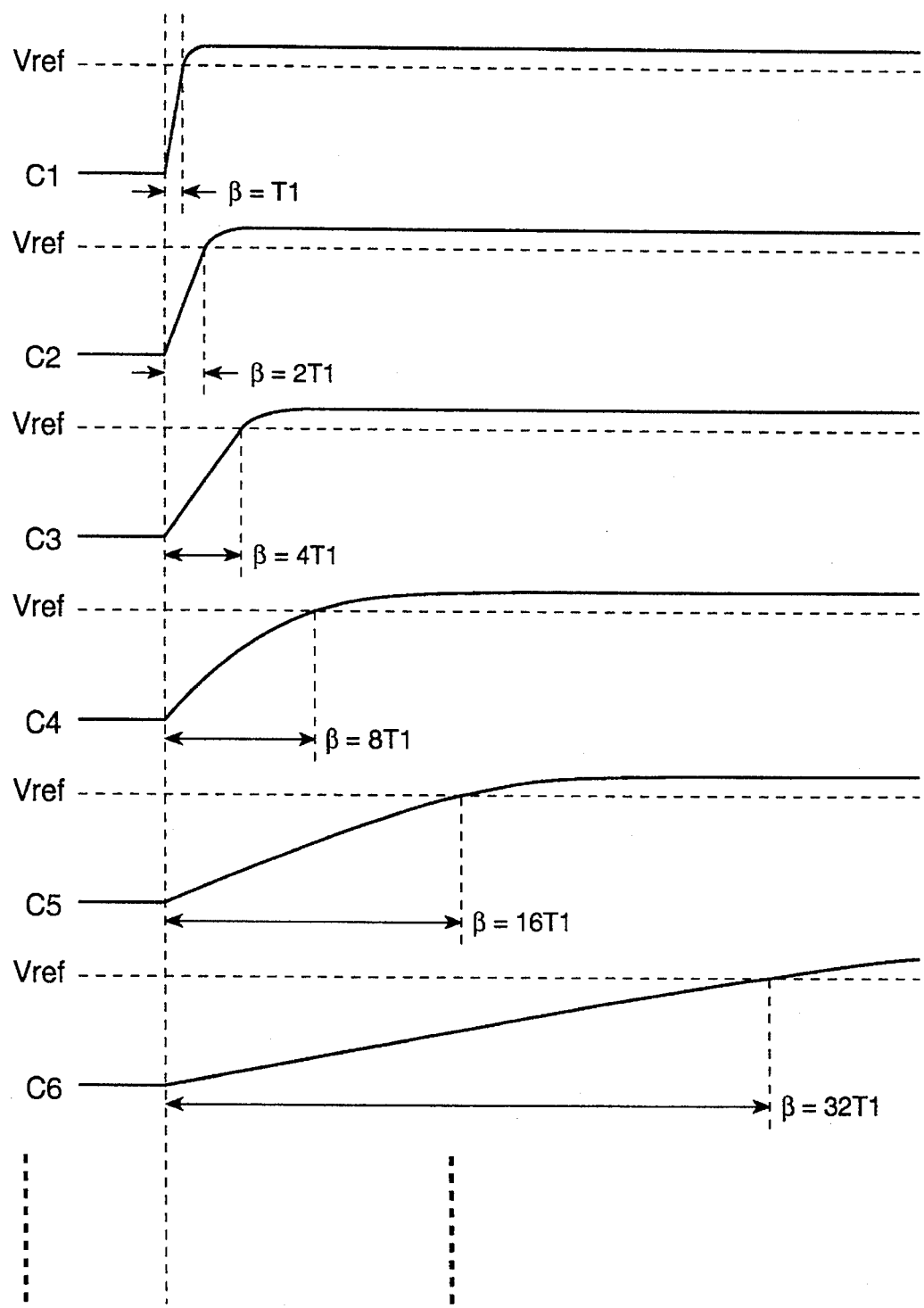
FIG. 6 is a diagram showing the difference in time constants used for channel setting.

The microcomputer calculates the ratio $\alpha/\beta$ of the time data $\alpha$ read at step S1 and the time data $\beta$ read at step S2 (S3). The time data $\beta$ is almost constant in all controllers 30$a$ to 30$g$. This is because the capacitive value of the capacitor C0 in all controllers 30$a$ to 30$g$ is the same. On the other hand, the time data $\alpha$ varies in all controllers 30$a$ to 30$g$. This is because the capacitive values of the respective capacitors C1 to C7 differ. As shown in FIG. 6, the capacitors C1 to C7 differ in the capacitive value, and hence the time data $\beta$ is different (capacitor C7 is not shown in FIG. 6 because of the limited space in the drawing). Therefore the ratio $\alpha/\beta$ differs in each of the controllers 30$a$ to 30$g$. On the basis of the fact that the ratio $\alpha/\beta$ varies in each controller, the microcomputer 304 detects the channel number of the connector 11$a$ to which the controller 30$a$ is connected (step S4). That is, in the internal memory of the microcomputer 304, the time data $\beta$ at the time of connection of the controller to the connectors 11$a$ to 11$g$ is stored in advance, and the microcomputer 304 detects the channel number according to the stored data. The microcomputer 304 subsequently stores the channel number detected at step S4 into the internal memory of the microcomputer 304 (step S5).

The microcomputer 304 waits for a read command from the main body apparatus 10 (step S6). Upon receiving the read command from the main body apparatus 10, the microcomputer 304 judges if the ID number included in the read command coincides with the channel number stored in the internal memory in step S5 (Step S7). If the ID number does not coincide, the microcomputer 304 returns to step S6, and waits for another read command from the main console 10. The ID number and channel number will coincide when the read command is destined for the controller with that channel number. When this coincidence condition occurs, the microcomputer 304 reads in the switch signals from the operation switches SW1 to SW12 and slope detection signals from the slope detecting circuits 308, 309 through the input circuit 307 (hereinafter the switch signals and slope detection signals are collectively called "operation status signals") (step S8).

Figure 7:
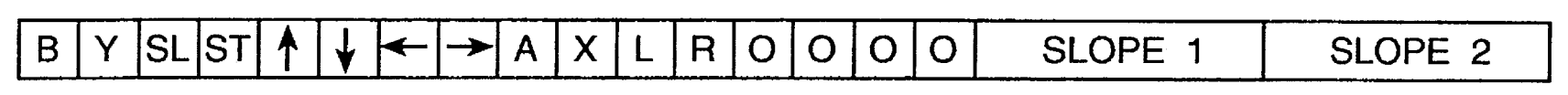

Next, the microcomputer 304 stores the operation status signals into a packet as shown in FIG. 7, and issues a serial output (step S9). The serial output signal of the microcomputer 304 is modulated in the modulator 305, and is supplied to the port A of the I/O circuit 140 through the data signal line D3.

Figure 8:
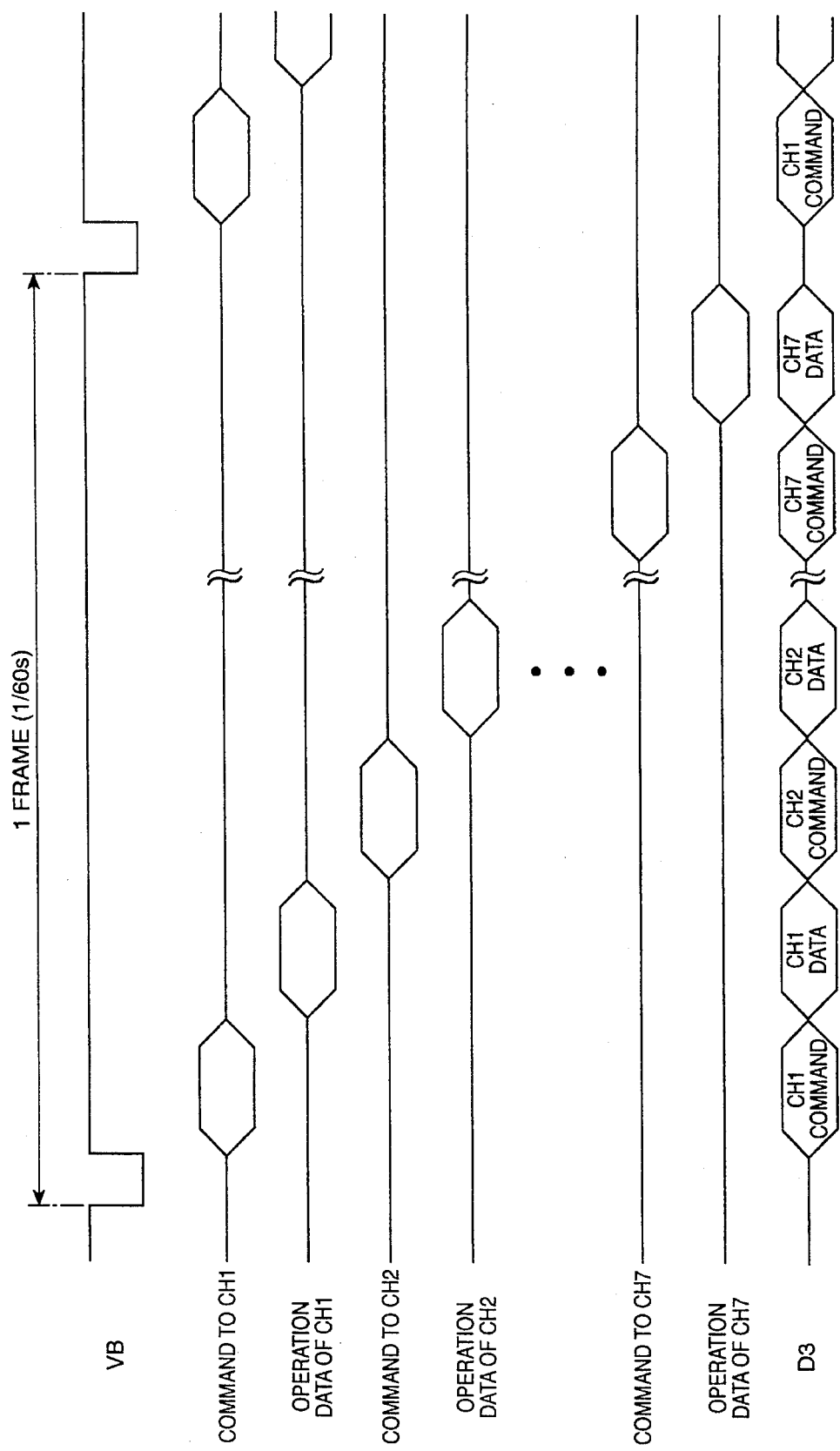
FIG. 8 is a time chart showing the transmission and reception timing of data between the interface 140 and controllers 30a to 30g.
Figure 9:
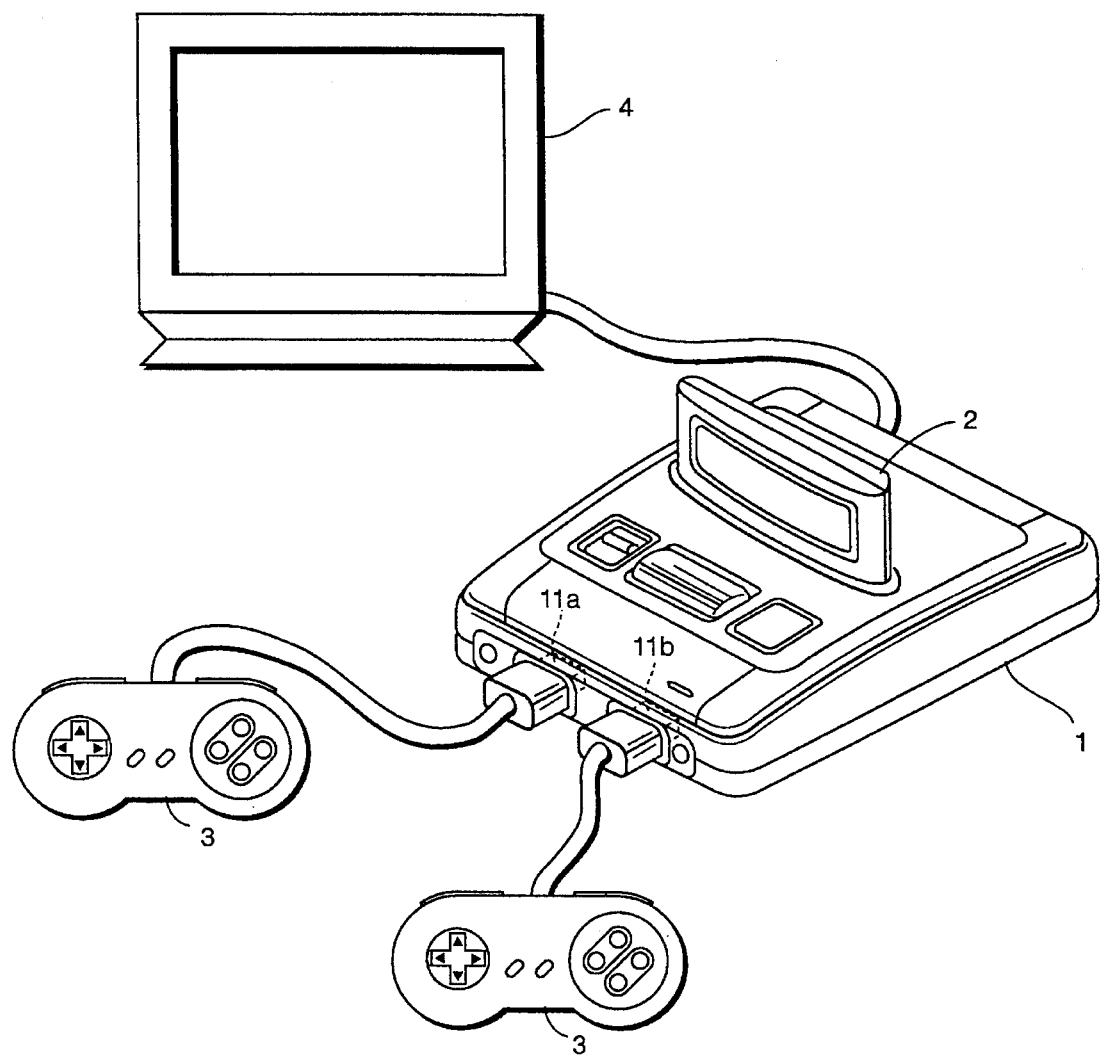
FIG. 9 is a perspective view showing a general constitution of a prior art electronic game system.

FIG. 8 is a time chart showing the timing of data transmission and reception between the I/O circuit 140 and controllers 30$a$ to 30$g$. Referring to FIG. 8, hereinafter, the time sharing multiplex communication exchanged between the I/O circuit 140 and controllers 30$a$ to 30$g$ is explained below. One session of transmission and reception of data between the I/O circuit 140 and controllers 30$a$ to 30$g$ is completed within one frame period (1/60 second) of the television 4. First, from the microcomputer 142 in the I/O circuit 140, a read command including the ID number CH1 of the connector 11$a$ is sent out serially. This read command is modulated in the modulator 143, and is supplied into the controllers 30$a$ to 30$g$ through the data signal line D3. In each of the controllers 30$a$ to 30$g$, the read command is demodulated in the demodulator 306, and is given to the microcomputer 304. At this time, the ID number CH1 included in the read command coincides with the channel number detected by the controller 30$a$, and hence the microcomputer 304 in the controller 30$a$ issues a serial output of the operation status signals of the operation switches SW1 to SW12 and slope detecting circuits 308, 309. This serial output signal of the microcomputer 304 is modulated in the modulator 305, and is supplied into the I/O circuit 140 through the data signal line D3. In the I/O circuit 140, the operation status signals from the controller 30$a$ are demodulated in the demodulator 144, and given to the microcomputer 142. The microcomputer 142 writes the given operation status signals into the dual memory port 141.

Thereafter, the microcomputer 142 in the interface 140 also issues a serial output of the read command including the ID signal CH2 of the connector 11$b$. This read command is modulated in the modulator 143, and is supplied to the controllers 30$a$ to 30$g$ through the data signal line D3. At this time, the ID number CH2 included in the read command coincides with the channel number detected by the controller 30$b$, and hence the microcomputer 304 in the controller 30$b$ issues a serial output of the operation status signals of the operation switches SW1 to SW12 and slope detecting circuits 308, 309. The serial output signal of the microcomputer 304 is modulated in the modulator 305, and is supplied to the I/O circuit 140 through the data signal line D3. In the I/O circuit 140, the operation status signals from the controller 30$b$ are demodulated in the demodulator 144, and are given to the microcomputer 142. The microcomputer 142 writes the given operation status signals into the dual port memory 141.

Similarly, thereafter, the microcomputer 142 in the interface sequentially issues the read commands including the ID numbers CH3 to CH7 of the connectors 11$c$ to 11$g$ to the controllers 30$c$ to 30$g$ through the data output line D3. In response, from the controllers 30$c$ to 30$g$, the internal operation status signals are serially outputted, and supplied into the I/O circuit 140 through the data signal line D3. In the I/O circuit 140, the operation status signals from the controllers 30$c$ to 30$g$ are written into the dual port memory 141. The main CPU 12 in the main console 1 reads out the operation status signals from the controllers 30$a$ to 30$g$ written in the dual port memory 141 at an appropriate timing.

Thus, the I/O circuit 140 applies read commands to the controllers 30$a$ to 30$g$ in a time sharing manner, and collects the operation status signals from the controllers 30$a$ to 30$g$ also in a time sharing manner. Therefore, regardless of the number of connectors installed initially or to be expanded in the future, the I/O circuit 140 requires only one port, and for communication between the I/O circuit 140 and controllers 30a to 30g, only one signal line suffices. Such time sharing serial communication between the I/O circuit 140 and controllers 30a to 30g is realized because each controller 30a to 30g has a unique assigned channel number that allows it to distinguish the read commands addressed to itself from the read commands addressed to the other controllers. In this embodiment, the access to the seven connectors 11a to 11g is always sequential. In the case where a connector is not connected with the controller, that controller will provide no response, thus informing the CPU 12 that the controller is unconnected.

In this embodiment, the channel numbers of the controllers 30a to 30g can be distinguished by adding capacitors C1 to C7 to the connectors 11a to 11g to vary the time constant in the first time constant circuit 301. Alternatively, the channel numbers may be assigned by varying the time constant by a resistance instead of by a capacitance. The resistance may be used to divide the supply voltage by the resistance or the like, and detecting the voltage after dividing by the A/D converter. Moreover, aside from the above method of analog assignment of channel numbers, a method of digital assignment of channel numbers may be possible by providing the connectors 11a to 11g with switches such as DIP switches, and identifying the channel numbers of the controllers 30a to 30g depending on the state of the switches. In short, each connector should be provided with an element or circuit having or generating parameters that can be distinguished at the controller side.

In the above embodiment, the capacitive values of the capacitors C1 to C7 for setting the channel number are varied by multiples, but this is only an example and they may be varied in any other suitable mode.

In the embodiment, four connectors 11a to 11d are provided in the main console, but the standard number of connectors provided may be more than or less than the four shown. Similarly, the number of connectors provided in the connector tap 6 may be more than or less than four. That is, in the invention, the number of connectors installed in the standard or expanded modes is limited only by the physical size of the main console 1 or connector tap 6 and not by the number of available ports on the I/O circuit 140 or the number of available data signal lines.

Thus, from the embodiments described, one can appreciate that each controller can detect the channel number assigned to it and then use that detected channel number to distinguish whether a read command transmitted from the main console is addressed to it or to another controller. Since read commands are sent out in parallel from one port to all of the controllers from the I/O circuit 140 installed in the main console, the main console can sequentially disperse the read commands addressed to the respective controllers. As a result, the number of ports on the I/O circuit 140 in the main console may be notably decreased as compared with that in the conventional electronic game machine, and the number of pins also may be curtailed significantly. In addition, embodiments of the present invention allow the number of available connectors to be expanded by using a connector tap or the like. With the present tap, the number of ports on the I/O circuit 140 and the number of signal lines between the I/O circuit 140 and the controllers are not influenced at all. This gives the present electronic game machine excellent future expandability.

One can also appreciate that with the present embodiments, since the channel number assigned to a controller can be detected by the controller provided in the main console, the controllers can easily distinguish whether a read command sent out from the main console by time division is addressed to them. As a result, the main console can send out read commands in parallel to the controllers from one port, and hence the construction is simplified as compared with the conventional electronic game machine.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An electronic game machine comprising a main console having a plurality of connectors, and a plurality of controllers detachably connected to corresponding ones of the plurality of connectors, wherein said main console comprises:

a central processing unit, an I/0 circuit relaying signals between said central processing unit and said connectors, and having a port to which the connectors are connected in parallel relative to each other, and a plurality of channel number specifying means corresponding to said connectors, for defining different parameters corresponding to different channel numbers associated with said connectors;

and wherein each controller comprises:

channel number detecting means for detecting the channel number associated with said controller, said detection based upon said channel number specifying means corresponding to said corresponding one of the connectors;

and wherein said I/O circuit comprises:

read command sending means for sending a read command including one of said channel numbers to each controller through the port; and each of said controllers further comprises:

coincidence detecting means for detecting whether said one channel number included in the read command coincides with the channel number associated with said controller as detected by said channel number detecting means, and operation status signal transmitting means for transmitting an operation status signal to the I/O circuit when said coincidence detecting means detects the coincidence of channel numbers.

2. An electronic game machine of claim 1, wherein said I/O circuit and connectors are connected by one data signal line, and the read command from the I/O circuit and the operation status signal from each controller are transmitted serially in two directions by said data signal line.

3. An electronic game machine of claim 1, wherein each of said channel number specifying means is a corresponding capacitor for setting channel numbers having individually different capacitive values, and said channel number detecting means detects the channel number by measuring the time constant when charging the corresponding capacitor.

4. A main console of an electronic game machine having a plurality of connectors to which a plurality of controllers are correspondingly detachably connected comprising:

a central processing unit, an I/O circuit for relaying signals between said central processing unit and said connectors, and having a port to which the connectors are connected in parallel relative to each other, and a plurality of channel number specifying means corresponding to said connectors, for defining different parameters corresponding to different channel numbers associated with said connectors;

wherein each controller detects the channel number associated with said controller, on the basis of said channel number specifying means of said corresponding connector, and wherein said I/O circuit comprises:

read command sending means for sending a read command including one of said channel numbers to each controller through the port; and each controller transmits an operation status signal to said I/O circuit when the channel number included in the read command coincides with the channel number associated with said controller.

5. Controllers detachably connected to a plurality of connectors provided in a main console of an electronic game machine, comprising:

a plurality of channel number specifying means defining different parameters corresponding to different of said connectors provided in said main body apparatus, channel number detecting means for detecting a defined channel number corresponding to one of said connectors, means for supplying a read command including a reference channel number corresponding to one of said connectors to receive the read command, coincidence detecting means for detecting whether the channel number included in the read command coincides with the defined channel number detected by the channel number detecting means, and operation status signal transmitting means for transmitting an operation status signal to said main console, in response to a detection by said coincidence detecting means of a coincidence between the reference channel number and the defined channel number.

6. A video game system comprising:

a main console having a main processor to run the video game and at least one I/O port to which a plurality of connectors each relay status signals, each connector having an element uniquely identifying the respective connectors to the I/O port; and a plurality of controllers having status switches, the controllers detachably connected to respective ones of the plurality of connectors to provide said respective ones of the plurality of connectors with said status signals.

7. A video game system according to claim 6, wherein the elements uniquely identifying the respective connectors are capacitors of differing values.

8. A video game system according to claim 6, further comprising an I/O circuit connected to the main processor and having the I/O port.

9. A video game system according to claim 6, whereby the controllers are connected through the respective connectors to the elements uniquely identifying the respective connectors, and whereby each controller includes a detector to identify the connector to which the controller is attached based on the element of said connector.

10. A video game system according to claim 6, further including a tap having a tap port to which a plurality of tap connectors each relay status signals, each tap connector having an element uniquely identifying the respective tap connectors.

11. A video game system according to claim 10, whereby the tap is detachably connected to one of the connectors of the main console, and whereby the elements uniquely identify all connectors and tap connectors.

* * * * *